UNITED STATES PATENT OFFICE.

MARTIN HERZBERG, OF ELBERFELD, GERMANY, ASSIGNOR TO THE FARBENFABRIKEN, VORMALS FR. BAYER & COMPANY, OF SAME PLACE.

MANUFACTURE OF DYE-STUFFS.

SPECIFICATION forming part of Letters Patent No. 384,316, dated June 12, 1888.

Application filed February 21, 1888. Serial No. 264,832. (Specimens.)

*To all whom it may concern:*

Be it known that I, MARTIN HERZBERG, doctor of philosophy, a subject of the Emperor of Germany, and residing at Elberfeld, assignor to the Farbenfabriken, vormals Fr. Bayer & Company, have invented a new and useful Improvement in the Manufacture of Dye-Stuffs or Coloring-Matters, of which the following is a specification.

My invention relates to the production of new brown coloring-matter for dyeing cotton, wool, and silk by the action of diazo compound of naphthylamine sulpho-acid on the coloring-matter well known in commerce under the name of "Bismarck brown," (triamidoazo-benzol or triamidoazo-toluol.)

For carrying out my process practically, I proceed as follows: 8.5 kilos of naphthylamine sulphonic acid are converted in the well-known manner into the muriatic diazo compound. The solution of the same is slowly, under continuous stirring, poured into a solution containing forty kilos of Bismarck brown. After having (settled) stood for about twelve hours, the mixture is made alkaline by a carbonate of alkali and heated. A brown solution is formed, which, after filtration, is precipitated by common salt. After some time, filter and dry. The dye-stuff thus obtained forms in a dry state a brown powder, which is easily soluble in water and dyes not mordanted cotton in a boiling alkaline or soap bath a splendid brown color which will not be altered by acetic acid. Silk and wool can be dyed with the same result in a boiling bath of common salt. On adding mineral acid to the aqueous solution the free acid of the dye-stuff will be formed, which is insoluble in water, while alkali will not alter the product. With concentrated sulphuric acid the dye-stuff described dissolves into a dirty violet powder.

I do not claim in this application the process described, intending to make a separate application.

What I claim as my invention, and desire to secure by Letters Patent, is—

The brown coloring-matter herein described, which has the following characteristics: it exists as a brown powder easily soluble in water, dyes cotton, wool, and silk a splendid brown in a boiling bath of common salt, cotton likewise in a boiling alkaline or soap bath, which color will not be altered by acetic acid; by adding muriatic acid to the aqueous solution the free acid of the dye-stuff is formed; with concentrated sulphuric acid the dye-stuff described dissolves into a dirty violet-brown color.

In testimony whereof I have signed my name to this specification in the presence of two witnesses.

MARTIN HERZBERG.

Witnesses:
 ANTON KEUTER,
 OTTO KRAUSE.